(12) United States Patent
Das et al.

(10) Patent No.: US 9,195,551 B2
(45) Date of Patent: Nov. 24, 2015

(54) ENHANCED STORAGE OF METADATA UTILIZING IMPROVED ERROR DETECTION AND CORRECTION IN COMPUTER MEMORY

(75) Inventors: Debaleena Das, Los Gatos, CA (US); Rajat Agarwal, Beaverton, OR (US); C. Scott Huddleston, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 181 days.

(21) Appl. No.: 13/997,961

(22) PCT Filed: Mar. 29, 2012

(86) PCT No.: PCT/US2012/031216
§ 371 (c)(1),
(2), (4) Date: Oct. 29, 2013

(87) PCT Pub. No.: WO2013/147794
PCT Pub. Date: Oct. 3, 2013

(65) Prior Publication Data
US 2014/0047265 A1 Feb. 13, 2014

(51) Int. Cl.
*G06F 11/00* (2006.01)
*G06F 11/16* (2006.01)
*G06F 11/10* (2006.01)

(52) U.S. Cl.
CPC ........ *G06F 11/1666* (2013.01); *G06F 11/1064* (2013.01)

(58) Field of Classification Search
CPC .. G06F 11/1666; G06F 11/1064; G06F 12/16
See application file for complete search history.

(56) References Cited

U.S. PATENT DOCUMENTS

| | | | |
|---|---|---|---|
| 7,043,679 B1 * | 5/2006 | Keltcher et al. | 714/763 |
| 7,757,153 B2 | 7/2010 | Hwang et al. | |
| 8,127,205 B2 | 2/2012 | Hirano et al. | |
| 2009/0187744 A1 * | 7/2009 | Greenhalgh | 712/213 |
| 2010/0146368 A1 * | 6/2010 | Chishti et al. | 714/755 |
| 2010/0251036 A1 * | 9/2010 | Moyer | 714/53 |
| 2011/0289380 A1 | 11/2011 | Wilkerson et al. | |
| 2013/0326263 A1 * | 12/2013 | Alameldeen et al. | 714/6.2 |
| 2013/0339823 A1 * | 12/2013 | Meaney et al. | 714/773 |
| 2014/0229797 A1 * | 8/2014 | Agrawal et al. | 714/766 |

OTHER PUBLICATIONS

International Search Report, PCT/ISA/210, Nov. 29, 2012, total of 3 sheets.

* cited by examiner

*Primary Examiner* — Yolanda L Wilson
(74) *Attorney, Agent, or Firm* — Pillsbury Winthrop Shaw Pittman LLP

(57) ABSTRACT

A novel ECC scheme is disclosed that offers an error protection level that is at least the same as (if not better than) that of the conventional ECC scheme without negatively impacting latency and design complexity. Embodiments of the present disclosure utilize an ECC scheme which leaves up to extra 2B for metadata storage by changing the error detection and correction process flow. The scheme adopts an early error detection mechanism, and tailors the need for subsequent error correction based on the results of the early detection.

22 Claims, 6 Drawing Sheets

| Error Case | Error Magnitude Syndrome | Device Locator Syndrome |
|---|---|---|
| No error | Zero | Zero |
| Correctable device error | Non-zero | Non-zero |
| DUE device error | Non-zero | Zero |

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| D00 P0 | D01 | D02 | D03 | D04 | D05 | D06 | D07 | D08 | D09 | D0A | D0B | D0C | D0D | D0E | D0F | L0 | |
| D10 P1 | D11 | D12 | D13 | D14 | D15 | D16 | D17 | D18 | D19 | D1A | D1B | D1C | D1D | D1E | D1F | M1 | |

FIG. 3

| DD_0 | DD_1 | DD_2 | DD_3 | DD_4 | DD_5 | DD_6 | DD_7 | DD_8 | DD_9 | DD_A | DD_B | DD_C | DD_D | DD_E | DD_F | LM |
|---|---|---|---|---|---|---|---|---|---|---|---|---|---|---|---|---|
| α_0 | α_1 | α_2 | α_3 | α_4 | α_5 | α_6 | α_7 | α_8 | α_9 | α_A | α_B | α_C | α_D | α_E | α_F | 1 |

ENHANCED STORAGE OF METADATA UTILIZING IMPROVED ERROR DETECTION AND CORRECTION IN COMPUTER MEMORY

TECHNICAL FIELD

This disclosure relates generally to the field of high-volume computer architecture, and in particular, to reliability of memory subsystems using improved error correction code in near memory.

BACKGROUND ART

Achieving and maintaining a desired level of performance reliability may be essential for certain business-critical computer systems, such as, servers designed to provide high-volume storage capacity, intensive data crunching, high-speed communication interfacing, etc. Reliability of the memory subsystems often plays a key role in meeting overall server reliability, availability, and serviceability (RAS) benchmark. Single Device Data Correction (SDDC), a computer memory technology for error checking and correcting, developed by Intel Corp., is a pivotal RAS feature for Dynamic Random Access Memory (DRAM) subsystem in servers due to the significant hard-failure rate associated with DRAM devices. SDDC is typically implemented using Error Correcting Code (ECC) memory, such as, ECC Dual In-Line Memory Modules (DIMMs).

ECC memory is common in the industry for its positive impact on server reliability. ECC memory is able to detect and correct single bit memory errors. However, the increase of memory capacity, the density of memory on a single DIMM, and the increase in speed of the memory subsystem have significantly increased the risks of multi-bit memory errors that cannot be corrected by conventional ECC memory, resulting in system failure. A special type of advance ECC memory, referred in the industry as "Chipkill" memory, is known to reduce chances of system downtime caused by memory device failures, including multi-bit memory errors. The term 'chipkill' indicates detection and correction of failed device. This technology was originally developed by IBM Corp. for mission-critical systems, but is gradually distilling down to consumer systems as well. For example, the market interest in cloud-based computing is definitely providing a positive push towards enhancing overall system reliability in a cost-effective and power-efficient way.

Going back to the ECC memory architecture, a conventional x4 DIMM has 2 spare devices and a x8 DIMM has 1 spare device that can be used for ECC. RAS-conscious customers either use x4 DIMMs or x8 DIMMs along with special features (such as, operating two channels in 'lockstep' to increase the number of available ECC devices) to achieve SDDC. Conventionally, SDDC requires a minimum of 2 spare devices. A significant portion of the spare devices has to be used to store tag bits, and there may not be enough bits left to implement SDDC using conventional ECC codes. With this said, there appears to be room for improving ECC memory subsystems that also frees up capacity for metadata storage.

BRIEF DESCRIPTION OF THE DRAWINGS

Embodiments of the present disclosure are illustrated by way of example, and not by way of limitation, in the figures of the accompanying drawings in which like reference numerals refer to similar elements.

FIG. 2 depicts a table listing various types of device errors, according to aspects of the present disclosure.

FIG. 3 depicts logical layout of payload data and additional information in the memory devices in the cache line, according to aspects of the present disclosure.

FIG. 5 depicts logical layout of the finite-field-mathematics-based ECC code, according to aspects of the present disclosure.

DETAILED DESCRIPTION

Figure 1:
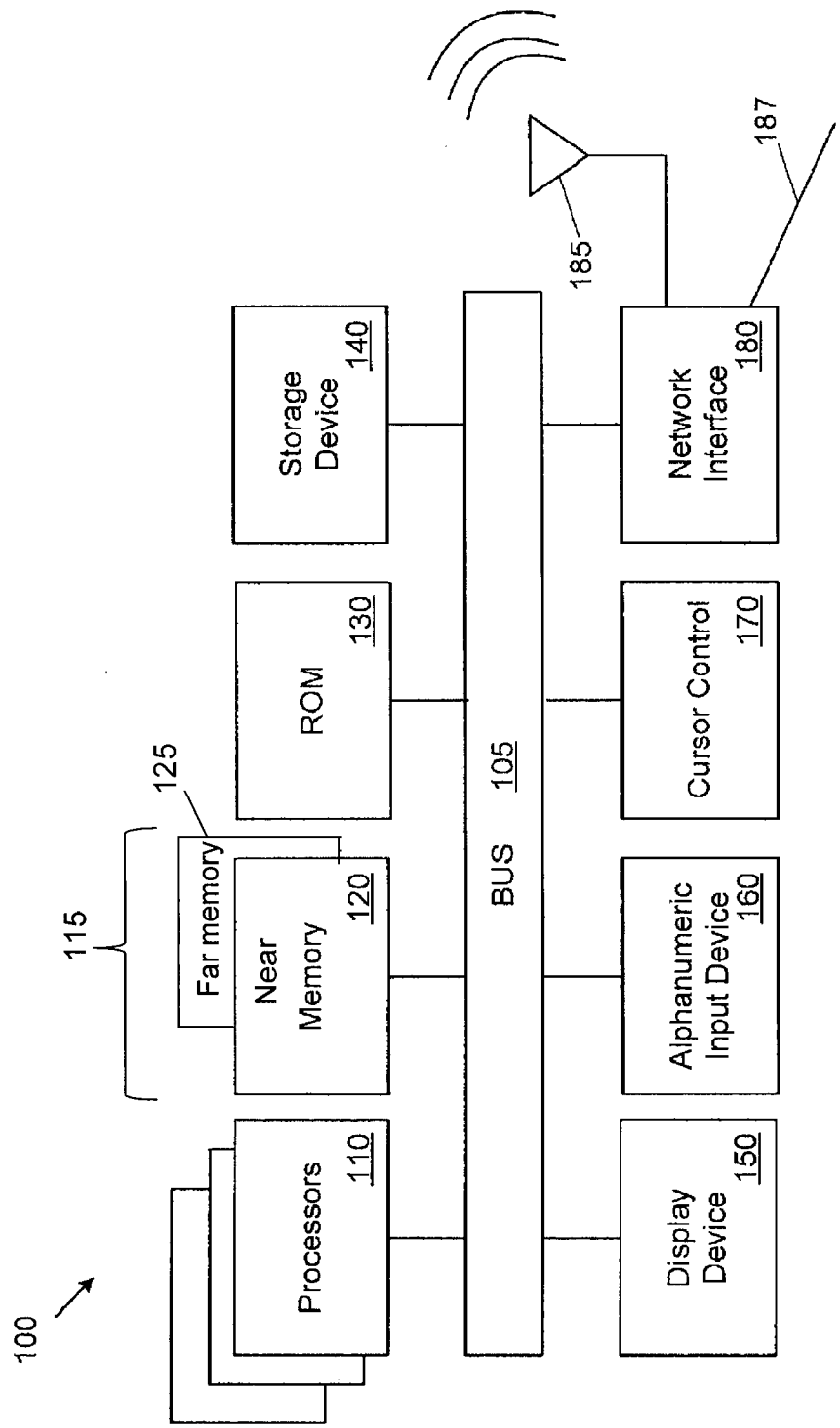
FIG. 1 is a block diagram of a computer system where embodiments of the present disclosure may be implemented.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of the present disclosure, what is proposed is a novel ECC scheme that provides an early error detection scheme and tailors subsequent error correction based on the results of the early detection. Such a scheme may be achieved without negatively impacting latency and design complexity.

Before describing the detailed description of the specific embodiments, a computer system is described where embodiments of the present disclosure may be implemented. FIG. 1 is a block diagram of an example computer system, such as a parallel computing system. The computing system illustrated in FIG. 1 is intended to represent a range of parallel computing systems, including, but not limited to, multi-core systems, symmetric systems, asymmetric systems etc. Alternative computing systems can include more, fewer and/or different components.

Because computer system 100 is a parallel computing system, processors 110 may operate on data in parallel. This parallel operation requires some mechanism to synchronize the results of these parallel operations. Computer system 100 also includes bus 105 or other communication device to communicate information, and processors 110 coupled to bus 105 to process information.

Computer system 100 further includes a dynamic storage device 115 (referred to as memory or memory system), coupled to bus 105 to store information and instructions to be executed by processors 110. Memory 115 also can be used to store temporary variables or other intermediate information during execution of instructions by processors 110. Some of all of memory 115 may be implemented as Dual In-line Memory Modules (DIMMs).

In the present disclosure, a two-level memory (2LM) has been described, where the memory 115 comprises a first memory subsystem and a second memory subsystem. The first memory subsystem is indicated as near memory 120 in the specific example shown in FIG. 1. The second memory subsystem is indicated as far memory 125 in the specific example shown in FIG. 1. As will be discussed in greater detail, an error detection and correction module (not shown specifically) according to the present disclosure is coupled to the near memory 120, performing an improved error detection and correction operation leaving enhanced metadata storage capacity in the near memory, such that the overall reliability of the memory system 115 is enhanced. The error correction operation may be controlled by the processor 110. In one embodiment, the near memory may be a DRAM subsystem (e.g., cache). The far memory may be a phase change memory (PCM) or other type of memory, which may control switching.

Computer system 100 also includes read only memory (ROM) and/or other static storage device 130 coupled to bus 105 to store static information and instructions for processor 110. Data storage device 140 is coupled to bus 105 to store information and instructions. Data storage device 140 such as a magnetic disk or optical disc and corresponding drive can be coupled to computer system 100.

Computer system 100 can also be coupled via bus 105 to display device 150, such as a cathode ray tube (CRT) or liquid crystal display (LCD), to display information to a user. Alphanumeric input device 160, including alphanumeric and other keys, is typically coupled to bus 105 to communicate information and command selections to processor 110. Another type of user input device is cursor control 170, such as a mouse, a trackball, or cursor direction keys to communicate direction information and command selections to processor 110 and to control cursor movement on display 150. Computer system 100 further includes network interface 180 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 180) that is either wired (187) or wireless (185), etc. In alternative embodiments, hard-wired circuitry can be used in place of or in combination with software instructions. Thus, execution of sequences of instructions is not limited to any specific combination of hardware circuitry and software instructions.

A computer-readable medium includes any mechanism that provides content (e.g., computer executable instructions) in a form readable by an electronic device (e.g., a computer, a personal digital assistant, a cellular telephone). For example, a computer-readable medium may include read only memory (ROM); random access memory (RAM); magnetic disk storage media; optical storage media; flash memory devices, etc.

Having described the computer system in FIG. 1, we focus on the novel features of the present disclosure and its applications. It will be appreciated that there may be a variety of applications where there is a need for some additional information stored in the cache line in the memory subsystem. Examples of the additional information include, but are not limited to, synchronization information for faster barrier handling, storage of directory in memory, tag bits when memory is used as a cache, etc.

As mentioned briefly before, one exemplary scenario where cache line storage is useful is in a two-level memory (2LM) architecture. As a non-limiting example, a Phase Change Memory with Switch (PCMS) can be used as the main memory (or far memory) and a DRAM memory subsystem can be used as a cache (or near memory). When standard ECC codes are used, a significant portion of the spare devices in the DRAM is used to store tag bits and there are not enough bits left to implement SDDC. As an illustrative example, the specific configuration in a Purley platform requires a 64B cache line to store 2B of tag data, leaving 6B for ECC.

Some of the typical 2LM requirements are as follows: a) an ECC scheme that uses 6B per cache line (2B per cache line used for metadata); b) error protection levels same or better than currently available ECC (e.g., currently available ECC with 2 directory bits per cache line has RAS levels close to SDDC); c) same or better latency than legacy KC; and, d) design complexity in the same order as legacy ECC. It will be appreciated that none of the current techniques are capable of meeting all of these requirements.

With this said, what is presented is a novel ECC scheme that fulfills all the 2LM requirements. For example, the novel ECC design is a custom code based on finite field mathematics (discussed later) that uses 6B per cache line. In the presented ECC scheme, separate boundaries for detection and correction are used to simultaneously meet the correction and latency requirements. ECC is implemented on the full cache line boundary while data may be ready for processing on the half cache line granularity. For example, in the 64B data scenario, detection is done on the 32B boundary. Data may also be ready for processing if there are no errors. This ensures that there is no latency hit for the error-free cases, which are the predominant cases anyway.

If an error is detected, correction is performed on the 64B boundary. Increasing the data granularity for correction helps to get a very low Detectable Uncorrectable Error (DUE). As an example, 1 in 65,000 error pattern may cause DUE. This is better reliability than some of the current ECC schemes that are implemented on a half cache line boundary and have to accommodate only a couple of metadata bits. The ECC design of the present disclosure has a very sparse H matrix resulting in XOR trees of low depth in the ECC circuitry.

The following section elaborates on the ECC construction. By way of review, the two building blocks of a SDDC ECC code are the Error Magnitude ECC (for identifying failing bits) and Device Locator ECC (for identifying failed device). Both blocks of ECC require 4B check bits. In the proposed ECC code, a required number of error magnitude check bits is used. Parity is implemented across the chips. This provides full identification of failed bits. With regard to device locator check bits, only half the required bits are available. Therefore, it is not possible to identify the failed device for all errors. However, this shortcoming can be overcome by using the parity check matrix discussed below. By using the parity check matrix, it is ensured that a very large percentage of the errors are correctable, as each device has a unique locator syndrome for a given error pattern/magnitude. This ensures a low DUE. For all other errors, each device will return a zero locator syndrome. This ensures that silent data corruption (SDC) is zero. Further, the ECC provides control over assignment of error pattern to Correctable Error (CE) versus Detectable Uncorrectable Error (DUE).

The table 200 in FIG. 2 lists various error cases with corresponding error magnitude syndrome and device locator syndrome. Error magnitude syndrome has been referred to as 'parity' or 'parity syndrome' occasionally in this description. Note that all device errors (i.e., errors restricted to a device) are either CE or DUE. As mentioned before, 1 in 65,000 device error patterns will cause DUE. Non-device errors (i.e., errors spanning multiple devices) are either DUE or SDC are not necessarily accounted for in the table 200 in FIG. 2.

As indicated before, parity check matrix plays an important role in the overall efficacy of the ECC code. For example, among the 6B ECC, 4B of ECC is a parity across the chips. Parity is used to cover all the remaining chips including the other ECC/metadata chip. The remaining 2B of ECC (i.e. error locator) is described below.

The ECC code word is a cache line of 64B of payload data, distributed in thirty two (32) 16-bit chunks, as shown in FIG. 3. There are 18 memory devices (numbered 1 to 18) that physically implement this cache line including the data payload and additional information. In FIG. 3, the data payload is the combination of D00-D0F and D10-D1F. Among the additional symbols, L0 is the locator check symbol; P0 is the parity (error magnitude) check symbol covering D00-D0F, and L0; M1 is 16 bits of metadata, used for cache tags; and, P1 is the parity check symbol covering D10-D1F and M1.

[D00-D0F L0 P0] are the low cache line halves, and, [D10-D1F M1 P1] are the high cache line halves. Note that the terms 'high' and 'low' do not necessarily mean relative positioning in a physically restrictive sense, but represent two logical halves of the cache line, as indicated by the dashed line. In other words, i-th memory device contributes data chunks D0i and D1i in two transfers. Memory device 17 contributes error check /metadata symbols L0+M1, and device 18 contributes parity check symbols P0+P1. Parity check symbols are computed and checked for each half cache line individually. The locator is only computed and checked on the XOR of both cache line halves (requiring the full cache line to be available). Some hardware errors (e.g., device column errors) cause error correlations on certain sets of bits. To prevent correlated bits from being XOR-ed in locator calculation, embodiments of the present disclosure use a bit permutation on one cache line half before XOR-ing.

Figure 4A:
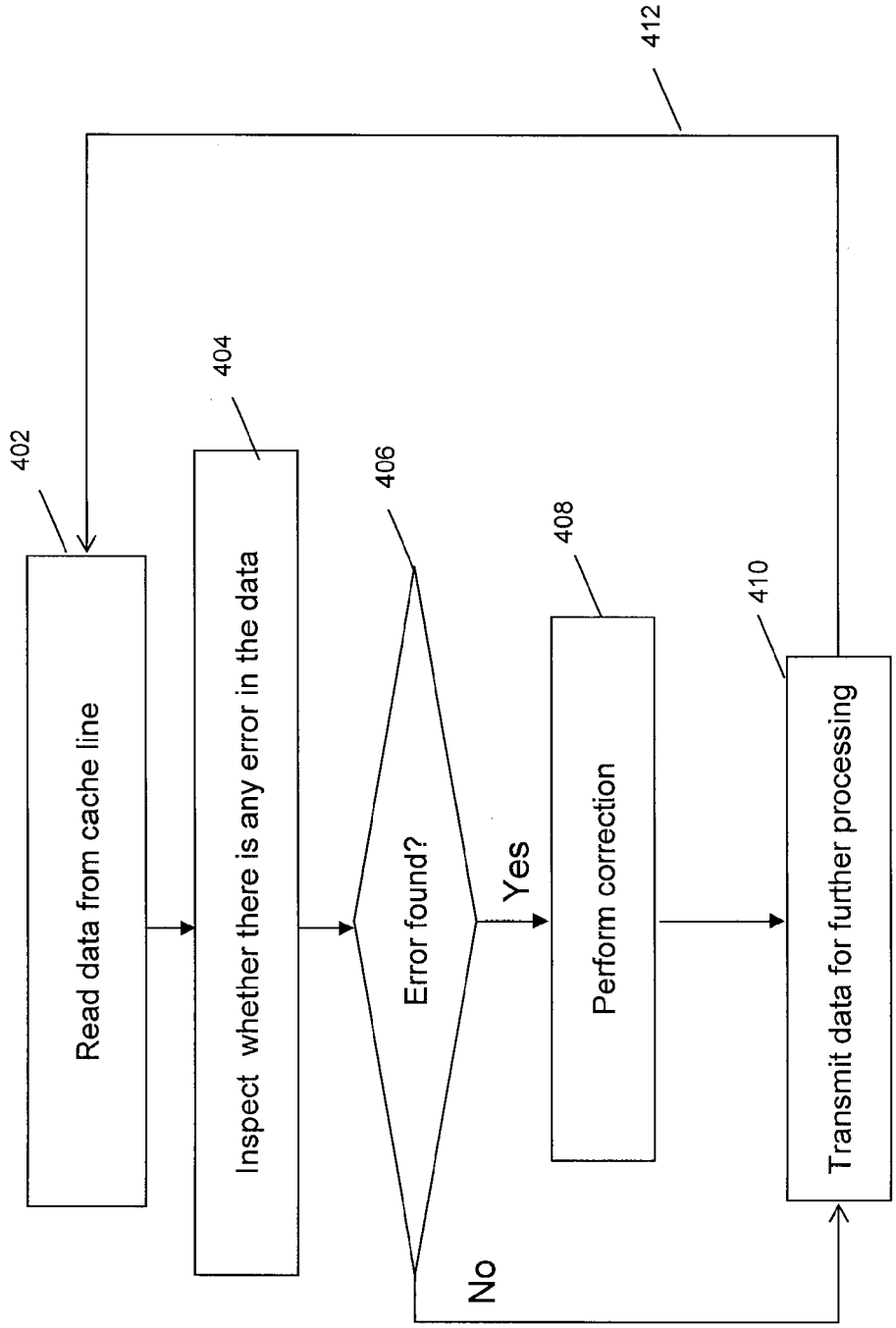
FIG. 4A depicts flow diagram of a conventional ECC scheme.

FIG. 4A depicts a flowchart of process 400A for a conventional ECC scheme. In the conventional ECC scheme, even if data is read at half cache line, the data correction is performed twice, as the entire operation is repeated twice for each half of the cache line. In block 402, first half of the data is read from the cache line. In block 404, the data is inspected to see if any error is detected. If error is detected in the decision block 406, a correction is performed in block 408, and then the corrected data is transmitted for further processing in block 410. If no error is detected at the decision block 406, then the correction block 408 is omitted, and the operation moves to block 410. This completes one half of data correction for the cache line. The loop 412 indicates that the process flow is performed again for the second half of the data in the cache line. In other words, in this scheme, 2B extra metadata storage in the cache line is not accommodated, because the entire cache line capacity is used for the ECC operation in the two loops.

Figure 4B:
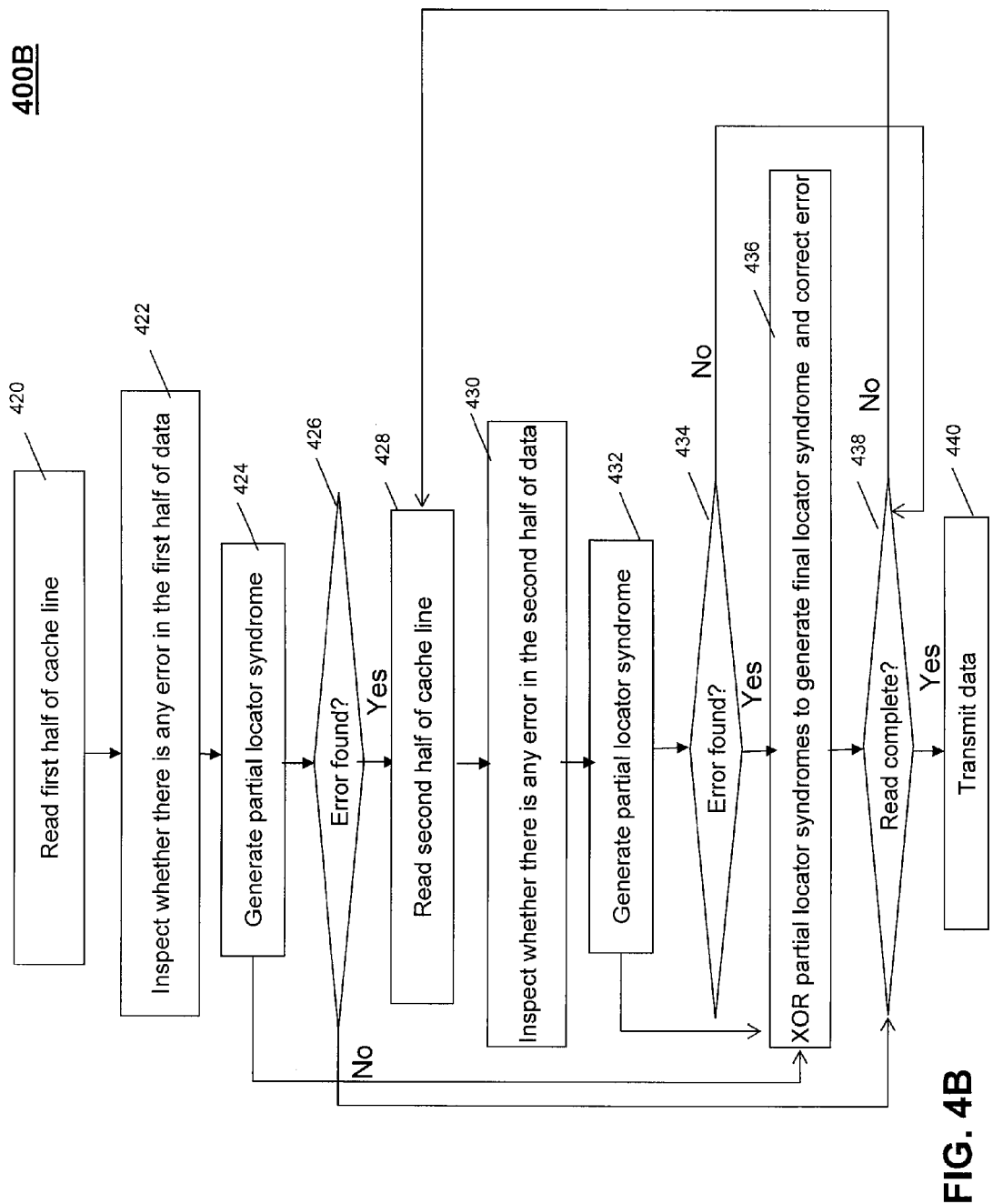
FIG. 4B depicts a flow diagram of a novel ECC scheme, according to aspects of the present disclosure.

Embodiments of the present disclosure utilize an ECC scheme which allows up to extra 2B for metadata storage by changing the error detection process flow, as provided by process 400B and depicted by FIG. 4B. In process 400B, the first half of the cache line is read in block 420, and in block 422, the first half of the data is inspected. A partial locator syndrome may be generated in block 424 irrespective of whether error is found or not. If no error is found in the decision block 426, then the data may be optionally transmitted for further processing (block 440) after checking whether read is complete in decision block 438. It will be appreciated that sending data to blocks 438 and 440 via the operational paths shown does not have to be immediate. Error-free first half of the data may be declared ready for further operation, and can be transmitted along with the second half of the data when the entire data set is ready for transmission.

The remaining half of the cache line is then read and second half of the data is retrieved in block 428. In block 430, the second half of the data is inspected for error, and another partial locator syndrome is generated for the second half of the data in block 432. If an error is found in decision block 434 (ad/or in decision block 426), correction is performed in block 436. Note that in block 436 both the partial locator syndromes from blocks 424 and 432 are XORed to generate the final locator syndrome, and appropriate correction is performed. Note that even if no error is found from the second half of the data, the error information from the first half is taken into account during block 436. If no error is found in the second half of the data, then the data is transmitted to check if read is complete in block 438. When read is not complete, data is transmitted for further processing in block 440.

Persons skilled in the art will appreciate that the illustrative process 400B is not restrictive to the scope of the present disclosure. Additional blocks may be added/altered in certain embodiments, and some blocks may be removed/declared optional in certain other embodiments. Also, the sequence of the blocks may be altered.

In summary, the comparisons of the processes 400A and 400B indicates the advantages of the improved ECC of this disclosure. The process 400A does not allow eliminating redundant steps and the entire process is repeated twice, even if no error is detected in the first half of the data in the cache line. If ECC is implemented at half cache line boundary, data is available for processing at the half cache line boundary. No early detection is necessary. However, the process 400B is capable of making an intelligent decision based on the early detection of errors, resulting in step saving, and freeing up cache line storage capacity (which is not available in process 400A) without losing performance benchmarks. In the process 400B, ECC is moved to the full cache line boundary. Data can still be processed at the half cache line boundary in order to meet latency requirement. By doing early detection, the new ECC scheme enables processing data at half cache line boundary if no errors are detected during the read.

By way of illustration, the following section discusses the finite field mathematical framework at a high level. Let z be a permutation on 16 bits. Each symbol is XOR-ed in one cache line half with a permutation of the corresponding symbol in the other cache line half to generate the symbols used for locator calculation. As shown in FIG. 5, DD_0 to DD_F are the data payload and L/M is the additional information. For the 'i'-th device, let $DD\_i=D0i+z(D1i)$ (for i in 0 ... 15), and, let $LM=L0+z(M1)$, where '+' indicates addition over Galois function, $GF[2^{16}]$ (i.e., bit-wise XOR operation). Let 0 and 1 be the additive and multiplicative identities in $GF[2^{16}]$, and let $\alpha\_0 \ldots \alpha\_F$ and 0, 1 be 18 distinct elements of $GF[2^{16}]$. Then the locator syndrome L is computed by the H matrix.

Moreover, let $S_0$ and $S_1$ be the parity syndromes for P0 and P1, and let L be the locator syndrome, and let $S=S_0+z(S_1)$. If there is an error in data device i, the parity and H matrix calculations always give $L=\alpha\_i*S$ where * denotes multiplication over $GF[2^{16}]$. An error in the L0/M1 device manifests as $L=1*S=S$, and an error in the P0/P1 device manifests as $L=0*S=0$. Since the $\alpha\_i$ are all distinct from each other and from 1 and from 0, this uniquely identifies the erroneous device whenever $S\neq$.

Errors with $S_0=z(S_1)\neq 0$ have $S=0$. This case still shows $L=\alpha\_i* S=0$, but the erroneous device is not identified, so such errors are not correctable. There are about $2^{16}$ in $2^{32}$ (~1 in 65,000) errors with $S_0=z(S_1)\neq 0$. This gives a DUE probability of about 1 in 65,000 for independent bit errors. For correlated bit errors, use of a suitable bit permutation preceding locator calculation (e.g., rotate each group of 4 bits by 1), guarantees no DUE for single column errors and minimizes DUE for multiple column errors.

The proposed ECC has zero SDC and negligible DUE from device errors with up to 2B of metadata per cache line being stored in the ECC devices. As reduced number of ECC bits are required, a compact ECC circuitry is obtained (by choosing the H matrix properly) while still meeting the latency requirements.

Aspects of disclosed embodiments can be used by high-end Central Processing Unit (CPU) and system manufacturers where RAS is a requirement. Any memory system with architecture similar to 2LM (e.g., PCMS as main memory and DRAM as cache) that claims full protection of DRAM device errors may use the novel ECC scheme disclosed herein.

Having thus described the novel concepts and principles of cache line storage of metadata in ECC memory, it will be apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A method, comprising:
    reading a first set of data from a block of data in a cache line at a first boundary within the block of data, wherein the first boundary is an intermediate boundary;
    inspecting the first set of data for errors;
    generating a record including inspection results for the first set of data;
    reading a second set of data from the block of data in the cache line at a second boundary within the block of data;
    inspecting the second set of data for errors; and
    updating the record by adding inspection results for the second set of data.

2. The method of claim 1, wherein the first boundary is at a midpoint of the block of data.

3. The method of claim 1, wherein the second boundary is at an end of the block of data.

4. The method of claim 1, wherein the method further comprises:
    correcting errors listed in an updated record, wherein the updated record includes inspection results from the first set of data and the second set of data.

5. The method of claim 4, wherein the method further comprises:
    transmitting corrected data for further processing.

6. The method of claim 1, wherein the method further comprises:
    upon determining that the first set of data is free of errors, transmitting the first set of data for further processing irrespective of whether the second set of data has been inspected yet.

7. The method of claim 1, wherein the record comprises one or both of error magnitude syndrome and device locator syndrome.

8. The method of claim 1, wherein errors identified are categorized as correctable error (CE) or detectable uncorrectable error (DUE).

9. The method of claim 1, wherein a reduced number of device locator check bits are used while correcting detected errors, thereby leaving additional metadata storage capacity in the cache line for meeting reliability requirement.

10. The method of claim 9, wherein the additional metadata storage capacity in the cache line is up to 2B.

11. The method of claim 1, wherein a parity check matrix is used in correcting detected errors.

12. A computer system, comprising:
    a memory system comprising a first memory subsystem and a second memory subsystem, and
    an error correction module coupled to the first memory subsystem, wherein the error correction module is to perform an error correction operation in the first memory subsystem using a reduced number of memory devices, thereby leaving additional metadata storage capacity in the first memory subsystem for meeting combined reliability requirement of the first memory subsystem and the second memory subsystem, wherein to perform the error correction operation, the error correction module is to:
    read a first set of data from a block of data in the first memory subsystem at a first boundary within the block of data, wherein the first boundary is an intermediate boundary;
    inspect the first set of data for errors;
    generate a record including inspection results for the first set of data;
    read a second set of data from the block of data in the first memory subsystem at a second boundary within the block of data;
    inspect the second set of data for errors;
    update the record by adding inspection results for the second set of data; and
    correct errors listed in the updated record, wherein the updated record includes inspection results from the first set of data and the second set of data.

13. The system of claim 12, wherein the first boundary is at a midpoint of the block of data.

14. The system of claim 12, wherein the second boundary is at an end of the block of data.

15. The system of claim 12, wherein, upon determining that the first set of data is free of errors, the error correction module to declare the first set of data ready for further processing irrespective of whether the second set of data has been inspected yet.

16. The system of claim 12, wherein the record comprises one or both of error magnitude syndrome and device locator syndrome.

17. The system of claim 12, wherein errors identified are categorized as correctable error (CE) or detectable uncorrectable error (DUE).

18. The system of claim 12, wherein the first memory subsystem comprises a cache line.

19. The system of claim 18, wherein a reduced number of device locator check bits are used while correcting detected errors, thereby leaving up to 2B additional metadata storage capacity in the cache line for meeting the reliability requirement.

20. The system of claim 19, wherein a parity check matrix is used in correcting detected errors.

21. The system of claim 12, wherein the second memory subsystem comprises phase change memory for switching.

22. A memory subsystem, including an error correction module to perform an error correction operation, the error correction operation comprising:
    read a first set of data from a block of data in the memory subsystem at a first boundary within the block of data, wherein the first boundary is an intermediate boundary;

inspect the first set of data for errors;
generate a record including inspection results for the first set of data;
read a second set of data from the block of data in the first memory subsystem at a second boundary within the block of data;
inspect the second set of data for errors;
update the record by adding inspection results for the second set of data; and
correct errors listed in the updated record, wherein the updated record includes inspection results from the first set of data and the second set of data.

* * * * *